United States Patent [19]

Kronzer

[11] Patent Number: 5,501,902
[45] Date of Patent: Mar. 26, 1996

[54] PRINTABLE MATERIAL

[75] Inventor: Francis J. Kronzer, Marietta, Ga.

[73] Assignee: Kimberly Clark Corporation, Neenah, Wis.

[21] Appl. No.: 268,089

[22] Filed: Jun. 28, 1994

[51] Int. Cl.$^6$ ..................................................... B32B 5/16
[52] U.S. Cl. .................. 428/323; 428/195; 428/200; 428/211; 428/479.3; 428/481; 428/485; 428/507; 428/913
[58] Field of Search ................... 428/195, 200, 428/211, 479.3, 481, 485, 507, 913, 323

[56] References Cited

U.S. PATENT DOCUMENTS

| | | | |
|---|---|---|---|
| 3,642,475 | 2/1972 | Vrancken et al. | 96/35 |
| 3,894,167 | 7/1975 | Kluge et al. | 428/40 |
| 3,949,138 | 4/1976 | Heiser | 428/323 |
| 4,107,365 | 8/1978 | Reed et al. | 428/202 |
| 4,224,358 | 9/1980 | Hare | 427/147 |
| 4,235,657 | 11/1980 | Greenman et al. | 156/234 |
| 4,284,456 | 8/1981 | Hare | 156/234 |
| 4,308,633 | 1/1982 | Van Huffel et al. | 15/104.93 |
| 4,315,790 | 2/1982 | Rattee et al. | 156/230 |
| 4,322,467 | 3/1982 | Heimbach et al. | 428/200 |
| 4,474,920 | 10/1984 | Kyminas et al. | 524/386 |
| 4,555,436 | 11/1985 | Geurtsen et al. | 428/200 |
| 4,557,964 | 12/1985 | Magnotta | 428/187 |
| 4,581,266 | 4/1986 | Magnotta | 428/40 |
| 4,773,953 | 9/1988 | Hare | 156/240 |
| 4,785,313 | 11/1988 | Higuma et al. | 346/135.1 |
| 4,863,781 | 9/1989 | Kronzer | 428/200 |
| 4,966,815 | 10/1990 | Hare | 428/497 |
| 4,980,224 | 12/1990 | Hare | 428/202 |
| 5,100,718 | 3/1992 | Weintraub | 428/195 |
| 5,242,739 | 9/1993 | Kronzer et al. | 428/200 |
| 5,271,990 | 12/1993 | Kronzer et al. | 428/195 |
| 5,320,898 | 6/1994 | Yoshida et al. | 428/195 |

OTHER PUBLICATIONS

"Polyox–Water–Soluble Resins Are Unique", Union Carbide Corp. Specialty Chemicals and Plastics Division, Old Ridgebury Road, Danbury, Connecticut 06817.

Primary Examiner—Patrick J. Ryan
Assistant Examiner—William A. Krynski
Attorney, Agent, or Firm—William E. Maycock

[57] ABSTRACT

A portable material having first and second surfaces, which printable material includes a first layer defining the first surface and a second layer defining the second surface. The second layer includes particles of a thermoplastic polymer having largest dimensions of less than about 50 micrometers and from about 10 to about 50 weight percent of a film-forming binder, based on the weight of the thermoplastic polymer. When the second layer has a melting point of from about 65 to about 180 degrees Celsius, the printable material is suitable for use as a heat transfer material. Desirably, the second layer also contains from about 2 to about 20 weight percent of a cationic polymer, based on the weight of the thermoplastic polymer. Other components which can be contained in the second layer include from about 1 to about 20 weight percent of a humectant; from about 0.2 to about 10 weight percent of an ink viscosity modifier; from about 0.1 to about 5 weight percent of a weak acid; and from about 0.5 to about 5 weight percent of a surfactant, all based on the weight of the thermoplastic polymer. If desired, one or two additional layers of heat-softenable polymeric materials can be included between the first layer and the second layer to aid in the heat transfer of an image-bearing second layer to a fabric.

46 Claims, 1 Drawing Sheet

PRINTABLE MATERIAL

BACKGROUND OF THE INVENTION

The present invention relates to a printable material, including a material suitable for use as a heat transfer material.

In recent years, a significant industry has developed which involves the application of customer-selected designs, messages, illustrations, and the like (referred to collectively hereinafter as "customer-selected graphics") on articles of clothing, such as T-shirts, sweat shirts, and the like. These customer-selected graphics typically are commercially available products tailored for that specific end-use. The graphics typically are printed on a release or transfer paper. They are applied to the article of clothing by means of heat and pressure, after which the release or transfer paper is removed.

Some effort has been directed to allowing customers the opportunity to prepare their own graphics for application to an article of clothing. The preparation of such graphics typically involves the use of colored crayons made from a heat-transferable material. Such crayons have been made available in kit form, which also includes an unspecified heat transfer sheet having an outlined pattern thereon. In a variation of the kit, the transferable pattern is created from a manifold of a heat transfer sheet and a reverse or lift-type copy sheet having a pressure transferable coating of heat transferable material thereon. By generating the pattern or artwork on the obverse face of the transfer sheet with the pressure of a drafting instrument, a heat transferable mirror image pattern is created on the rear surface of the transfer sheet by pressure transfer from the copy sheet. The heat transferable mirror image then can be applied to a T-shirt or other article by heat transfer.

The creation of personalized, creative designs or images on a fabric such as a T-shirt or the like through the use of a personal computer system has been described. The method involves electronically generating an image; electronically transferring the image to a printer; printing the image with the aid of the printer on an obverse surface of a transfer sheet which has a final or top coating consisting essentially of Singapore Dammar Resin; positioning the obverse face of the transfer sheet against the fabric; and applying energy to the rear of the transfer sheet to transfer the image to the fabric. The transfer sheet can be any commercially available transfer sheet, the heat-transferrable coating of which has been coated with an overcoating of Singapore Dammar Resin. The use of abrasive particles in the Singapore Dammar Resin coating also has been described. The abrasive particles serve to enhance the receptivity of the transfer sheet to various inks and wax-based crayons.

Improved heat transfer papers having an enhanced receptivity for images made by wax-based crayons, thermal printer ribbons, and impact ribbon or dot-matrix printers have been disclosed. For example, a cellulosic base sheet has an image-receptive coating containing from about 15 to about 80 percent of a film-forming binder and from about 85 to about 20 percent by weight of a powdered polymer consisting of particles having diameters from about 2 to about 50 micrometers. The binder typically is a latex. Alternatively, a cellulosic base sheet has an image-receptive coating which typically is formed by melt extrusion or by laminating a film to the base sheet. The surface of the coating or film then is roughened by, for example, passing the coated base sheet through an embossing roll.

Some effort also has been directed at generally improving the transfer of an image-bearing laminate to a substrate. For example, an improved release has been described, in which upon transfer the release splits from a carrier and forms a protective coating over the transferred image. The release is applied as a solution and contains a montan wax, a rosin ester or hydrocarbon resin, a solvent, and ethylene-vinyl acetate copolymer having a low vinyl acetate content. Additional effort has been directed to improving the adhesion of the transferred laminate to porous, semi-porous, or non-porous materials, and the development of a conformable transfer layer which enables the melt transfer web to be used to transfer print uneven surfaces.

Finally, it may be noted that there are a large number of references which relate to thermal transfer papers. Most of them relate to materials containing or otherwise involving a dye and/or a dye transfer layer, a technology which is quite different from that of the present invention.

In spite of the improvements in heat transfer papers, customer-selected graphics produced by desk-top publishing software and printed by ink jet printers result in graphics which in general are not transferred satisfactorily by known heat transfer papers. This is particularly true when transfer is attempted with a hand-held iron. Consequently, there is an opportunity for an improved heat transfer paper which has been developed specifically for graphics printed with an ink jet printer, i.e., an ink-jet printable heat transfer paper.

SUMMARY OF THE INVENTION

In response to the discussed difficulties and problems encountered in the prior art, a printable material, as well as an ink jet printable heat transfer material, have been discovered. The printable material has a first surface and a second surface and includes a first layer defining the first surface and a second layer defining the second surface. The second layer includes particles of a thermoplastic particle having largest dimensions of less than about 50 micrometers and from about 10 to about 50 weight percent of a film-forming binder, based on the weight of the thermoplastic polymer. When the second layer has a melting point of from about 65 to about 180 degrees Celsius, the printable material is suitable as a heat transfer material. Desirably, the second layer also contains from about 2 to about 20 weight percent of a cationic polymer, based on the weight of the thermoplastic polymer.

The first layer generally can be any material adapted for the end-use desired. The first layer typically will be a sheet material, more typically a flexible sheet material. Examples of flexible sheet materials include films, papers, nonwoven and woven webs, foils, and the like. When the printable material is intended for use as a heat-transfer material, the first layer often will be a film or a paper. As a heat-transfer material, the printable material of the present invention is particularly receptive to ink jet printer inks.

One or more other components may be used in the second layer, depending upon the nature of the printing medium which is to be applied thereto. For example, the second layer may contain from about 1 to about 20 weight percent of a humectant, based on the weight of the thermoplastic polymer. Desirably, the humectant will be selected from the group consisting of ethylene glycol and poly(ethylene glycol). The poly(ethylene glycol) typically will have a weight-average molecular weight of from about 100 to about 40,000. A poly(ethylene glycol) having a weight-average molecular weight from about 200 to about 800 is particularly useful.

The second layer also may contain from about 0.2 to about 10 weight percent of an ink viscosity modifier, based on the weight of the thermoplastic polymer. The viscosity modifier desirably will be a poly(ethylene glycol) having a weight-average molecular weight of from about 100,000 to about 2,000,000. The poly(ethylene glycol) desirably will have a weight-average molecular weight of from about 100,000 to about 600,000.

Other components which may be present in the second layer include from about 0.1 to about 5 weight percent of a weak acid and from about 0.5 to about 5 weight percent of a surfactant, both based on the weight of the thermoplastic polymer. A particularly useful weak acid is citric acid. The surfactant desirably will be a nonionic or a cationic surfactant. The surfactant is used primarily to help disperse the particles of thermoplastic powder. A weak acid may be useful in some cases to prevent yellowing when a cationic polymer is included in the second layer.

DETAILED DESCRIPTION OF THE INVENTION

Figure 1:
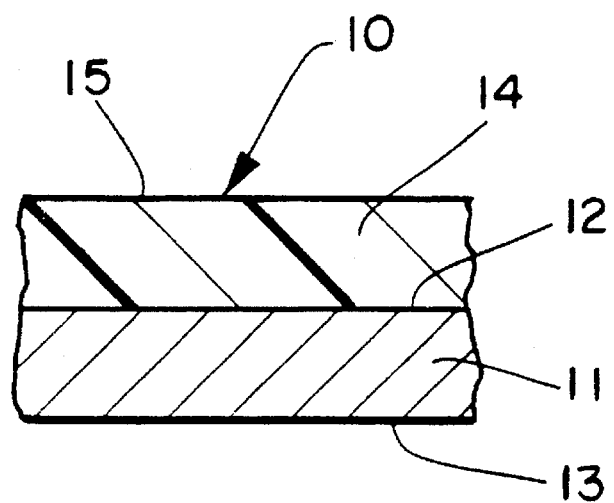
FIG. 1 is a fragmentary sectional view of a first embodiment of an ink jet printable heat transfer material made in accordance with the present invention.

As used herein, the term "printable" is meant to include the placement of an image on a material by any means, such as by direct and offset gravure printers, silk-screening, typewriters, laser printers, dot-matrix printers, and ink-jet printers, by way of illustration. Moreover, the image composition can be any of the inks or other compositions typically used in printing processes.

The term "ink-jet printable" refers to the formation of an image on a material, e.g., paper, by means of an ink-jet printer. In an ink-jet printer, ink is forced through a tiny nozzle (or a series of nozzles) to form droplets. The droplets are electrostatically charged and are attracted to an oppositely charged platen behind the paper. By means of electrically controlled deflection plates, the trajectories of the droplets can be controlled to hit the desired spot on the paper. Unused droplets are deflected away from the paper into a reservoir for recycling.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

The printable material of the present invention has first and second surfaces and includes a first layer defining the first surface and a second layer defining the second surface. The second layer includes particles of a thermoplastic polymer having largest dimensions of less than about 50 micrometers and from about 10 to about 50 weight percent of a film-forming binder, based on the weight of the thermoplastic polymer. Thus, the terms "particle size" and "average particle size" refer to the largest dimensions of the particles.

In general, the first layer can be any material adapted for the end-use desired. The first layer typically will be a sheet material, more typically a flexible sheet material. Examples of flexible sheet materials include films, papers, nonwoven and woven webs, foils, and the like.

When the printable material is intended for use as a heat-transfer material, the first layer often will be a film or a paper. An example of a suitable film is a biaxially oriented film having a typical thickness of 3 mils (about 0.08 mm). This type of film typically is used to make transparencies for overhead projectors. When a paper is employed as the first layer, the thickness of the paper desirably will be from about 3 to about 6 mils (from about 0.08 mm to about 0.15 mm). An especially useful paper is a label paper having what is referred to in the art as a print coating on one side. The print coat typically is a latex binder containing clay and starch, as is also well known in the art. The second layer usually is applied to the side of the paper not having the print coating, although the paper may have a print coating on both sides. While thinner or thicker papers may be used, the paper should have sufficient strength for handling, coating, sheeting, and other operations associated with its manufacture, and for removal after transferring an image. Other papers which may be used are latex-saturated papers.

The second layer includes particles of a thermoplastic polymer having largest dimensions of less than about 50 micrometers. Desirably, the particles will have largest dimensions of less than about 20 micrometers. In general, the thermoplastic polymer can be any thermoplastic polymer which meets the criteria set forth herein. Desirably, the powdered thermoplastic polymer will be selected from the group consisting of polyolefins, polyesters, and ethylene-vinyl acetate copolymers.

The second layer also includes from about 10 to about 50 weight percent of a film-forming binder, based on the weight of the thermoplastic polymer. Desirably, the amount of binder will be from about 10 to about 30 weight percent. In general, any film-forming binder may be employed which meets the criteria set forth herein. When the second layer includes a cationic polymer, a nonionic or cationic dispersion or solution may be employed as the binder. Suitable binders include polyacrylates, polyethylenes, and ethylene-vinyl acetate copolymers. The latter are particularly desired because of their stability in the presence of cationic polymers. The binder desirably will be heat softenable at temperatures of about 120° Celsius or lower.

The basis weight of the second layer may vary from about 5 to about 30 $g/m^2$. Desirably, the basis weight will be form about 10 to about 20 $g/m^2$. The second layer can be applied to the first layer, either directly or over a third or other layer, by means well known to those having ordinary skill in the art. For example, the layer may be applied by Meyer rod, air knife, and gravure coating, by way of illustration only.

When the printable material is intended to be used as a heat-transfer material, the second layer will have a melting point of from about 65 to about 180 degrees Celsius. The term "melts" and variations thereof are used herein only in a qualitative sense and are not meant to refer to any particular test procedure. Reference herein to a melting temperature or range is meant only to indicate an approximate temperature or range at which a polymer or binder melts and flows under the conditions of a melt-transfer process to result in a substantially smooth film.

Manufacturers' published data regarding the melt behavior of polymers or binders correlate with the melting requirements described herein. It should be noted, however, that either a true melting point or a softening point may be given, depending on the nature of the material. For example, materials such a polyolefins and waxes, being composed mainly of linear polymeric molecules, generally melt over a relatively narrow temperature range since they are somewhat crystalline below the melting point.

Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM E-28, is useful in predicting their behavior in the present invention. Moreover, the melting points or softening points described are better indicators of performance in this invention than the chemical nature of the polymer or binder.

When the printable material is intended to be used as a heat-transfer material, the second layer desirably also will contain from about 2 to about 20 weight percent of a cationic polymer, based on the weight of the thermoplastic polymer. The cationic polymer may be, for example, an amide-epichlorohydrin polymer, polyacrylamides with cationic functional groups, polyethyleneimines, polydiallylamines, and the like. When a cationic polymer is present, a compatible binder should be selected. The binder desirably will be a nonionic binder, either in the form of a solution or a nonionic or cationic dispersion or emulsion. As is well known in the paper coating art, many commercially available binders have anionically charged particles or polymer molecules. These materials are generally not compatible with the cationic polymer which may be used in the present invention.

One or more other components may be used in the second layer, particularly when the printable material is to be used as a heat transfer material, more particularly as an ink jet printable heat transfer material. For example, the second layer may contain from about 1 to about 20 weight percent of a humectant, based on the weight of the thermoplastic polymer. Desirably, the humectant will be selected from the group consisting of ethylene glycol and poly(ethylene glycol). The poly(ethylene glycol) typically will have a weight-average molecular weight of from about 100 to about 40,000. A poly(ethylene glycol) having a weight-average molecular weight of from about 200 to about 800 is particularly useful.

The second layer also may contain from about 0.2 to about 10 weight percent of an ink viscosity modifier, based on the weight of the thermoplastic polymer. The viscosity modifier desirably will be a poly(ethylene glycol) having a weight-average molecular weight of from about 100,000 to about 2,000,000. The poly(ethylene glycol) desirably will have a weight-average molecular weight of from about 100,000 to about 600,000.

Other components which may be present in the second layer include from about 0.1 to about 5 weight percent of a weak acid and from about 0.5 to about 5 weight percent of a surfactant, both based on the weight of the thermoplastic polymer. A particularly useful weak acid is citric acid. The term "weak acid" is used herein to mean an acid having a dissociation constant less than one (or a negative log of the dissociation constant greater than 1).

The surfactant may be an anionic, a nonionic, or a cationic surfactant. When a cationic polymer is present in the second layer, the surfactant should not be an anionic surfactant. Desirably, the surfactant will be a nonionic or cationic surfactant. However, in the absence of the cationic polymer, an anionic surfactant may be used, if desired. Examples of anionic surfactants include, among others, linear and branched-chain sodium alkylbenzenesulfonates, linear and branched-chain alkyl sulfates, and linear and branched-chain alkyl ethoxy sulfates. Cationic surfactants include, by way of illustration, tallow trimethylammonium chloride. Examples of nonionic surfactants, include, again by way of illustration only, alkyl polyethoxylates, polyethoxylated alkylphenols, fatty acid ethanol amides, complex polymers of ethylene oxide, propylene oxide, and alcohols, and polysiloxane polyethers. More desirably, the surfactant will be a nonionic surfactant.

For heat transfer applications, the printable material desirably with have a third layer which may be, for example, a release layer or a melt-transfer film layer. Additional layers may be included, if desired. Such third layer, and additional layers, if used, typically will be located between the first layer and the second layer.

A melt-transfer film layer typically comprises a film-forming binder, as already described, or other polymer. The layer desirably is applied by extrusion coating, but other methods also may be used. The melt-transfer film layer desirably is formed from a polyethylene or a copolymer of ethylene with acrylic acid, methacrylic acid, vinyl acetate, or acrylic acid esters such as ethyl acrylate. The polymer desirably will have a melt flow rate of at least about 30 grams per 10 minutes (g/10 minutes), as determined in accordance with ASTM Method D-1238), although the melt flow rate may be as high as about 4,000 g/10 minutes. More desirably, the melt flow rate of the polymer will be from about 300 to about 700 g/10 minutes. The basis weight of the melt-transfer film layer desirably will be from about 10 to about 50 grams per square meter (g/m$^2$), with a basis weight of from about 30 to about 50 being more desired.

A release layer may be included, either in place of or in addition to the melt-transfer film layer. In the former instance, the release layer will be placed between the first layer and the second layer. In the latter instance, the release layer will be placed between the first layer and the melt-transfer film layer. The latter is particularly desired when heat transfer will be accomplished by means of a hand-held iron. The release layer desirably will be a low molecular weight ethylene-acrylic acid copolymer applied from an aqueous dispersion. The melt flow rate of the ethylene-acrylic acid copolymer desirably will be at least about 200 g/10 minutes, more desirably from about 800 to about 1,200 g/10 minutes. Such dispersion also may contain a paraffin wax, which is mixed as an emulsion with the ethylene-acrylic acid copolymer dispersion. The paraffin wax emulsion can be any of those which are commercially available, such as Chemawax® 40 (Chematron, Inc., Charlotte, N.C.). The ratio of paraffin wax to the copolymer may vary from 0 to about 4, with a ratio of about 1 being more desirable. The basis weight of the release layer desirably will be from about 2 to about 20 g/m$^2$, more desirably from about 6 to about 10 g/m$^2$. The release coating as described melts easily and provides easy release from the first layer for hand ironing of images onto a fabric; such characteristic is especially useful if heating of the image is irregular, which is not atypical of hand-ironing techniques.

Figure 2:
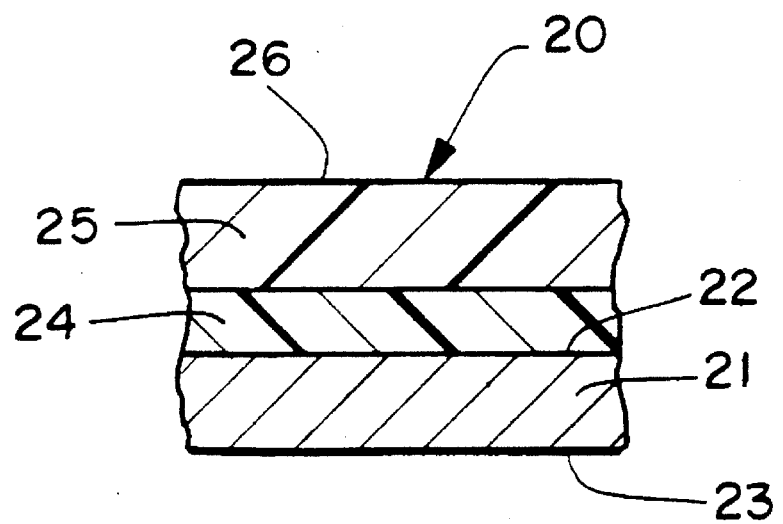
FIG. 2 is a fragmentary sectional view of a second embodiment of an ink jet printable heat transfer material made in accordance with the present invention.

Two embodiments of an ink jet printable heat transfer material are illustrated in FIGS. 1 and 2. Referring first to FIG. 1, there is shown a fragmentary section of an ink jet printable heat transfer paper 10. The paper 10 comprises a cellulosic nonwoven web 11 (first layer) and an ink jet printable heat transfer layer 14 (second layer) having an exposed surface 15. The base sheet 11 has a top surface 12 and a bottom surface 13. A film layer 14 overlays the top surface 12 of the base sheet 11. An image to be transferred (not shown) is applied to the surface 15 of the film layer 14.

As described earlier, a third layer can be present; this embodiment is shown in FIG. 2. In FIG. 2, a fragmentary section of an ink jet printable heat transfer paper 20 is shown. The paper 20 comprises a cellulosic nonwoven web base sheet 21 (first layer), a melt-transfer film layer 24 (third layer), and an ink jet printable heat transfer layer 25 (second layer) having an exposed surface 26. The base sheet 21 has a top surface 22 and a bottom surface 23. The film layer 24 overlays the top surface 22 of the base sheet 21 and the film layer 25 in turn overlays the film layer 24. An image to be transferred (not shown) is applied to the surface 26 of the film layer 25.

The second and any additional desired layers are formed by known coating techniques, such as by roll, blade, and air-knife coating procedures. The resulting material, then is dried by means of, for example, steam-heated drums, air impingement, radiant heating, or some combination thereof. Some care must be exercised, however, to assure that drying temperatures are sufficiently low so that the particles of thermoplastic polymer present in the second layer do not melt during the drying process. Air impingement for 5 minutes or more at 80° Celsius was used successfully.

Heat transfer of an image printed on the printable material of the present invention may be by any known means, such as by a hand-held iron or a heat transfer press. The latter is desired, however. The transfer temperature typically will be from about 120° to about 205° Celsius, for from about 5 seconds to about 2 minutes. A temperature of about 160° Celsius for about 15 seconds generally works well.

The present invention is further defined by the examples which follow. Such examples, however, are not to be construed as limiting in any way either the spirit or scope of the present invention. Whenever possible, units of measurement will be expressed as SI units (International System of Units), whether Basic or Derived. All temperatures are given in degrees Celsius, or °C., and all melt flow rate values were determined in accordance with ASTM Method D-1238. Unless indicated otherwise, all parts are parts by weight and all basis weights are on a dry-weight basis. When the drying of a layer or coating is specified in an example, a Model 28 Precision Scientific Electric Drying Oven was used.

Example 1

In order to reduce development variables to a reasonable number, all initial experiments utilized a single ink jet printer to evaluate various printable materials, namely, a Hewlett Packard Paint Jet® color printer. The image applied to the printable material by the printer in every case was the printer test pattern. After printing, the image was transferred to a 100 percent cotton shirt using a Hicks S-600 press at about 177° C. for 15 seconds.

A label stock base was used as the first layer or base sheet for all experiments. Both sides of the paper (i.e., the first and second surfaces of the first layer) were coated with a mixture of clay (Ultrawhite® 90, Englehard, Charlotte, N.C.) and latex (Hycar® 26084, a polyacrylate available from B. F. Goodrich Company, Cleveland, Ohio) in a ratio of 100:25. Each coating had a basis weight of 20 g/m². While the coatings helped prevent curling of the printable material, they are not needed, particularly if the paper used were less porous.

One side of the base sheet was coated with a melt-transfer layer (or third layer) consisting of a mixture of Michem® 58035 and Michem® Prime 4983. Both materials are available from Michelman, Inc., Cincinnati, Ohio. A ratio of four or five to one of 58035 to 4983 was used. The basis weight of the melt-transfer layer was 8 g/m². Michem® 58035 was a 35 percent solids dispersion of Allied Chemical's AC 580, which was approximately 10 percent acrylic acid and 90 percent ethylene. The polymer reportedly has a softening point of 102° C. and a Brookfield viscosity of 0.65 Pa s (650 centipoise) at 140° C. Michem® Prime 4983 was a 25 percent solids dispersion of Primacor® 5983 made by Dow Chemical Company. The polymer contained 20 percent acrylic acid and 80 percent ethylene. The copolymer had a Vicat softening point of 43° C. and a ring and ball softening point of 100° C. The melt flow rate of the copolymer was 500 g/10 minutes.

The melt-transfer layer then was coated with a second layer consisting of particles of a thermoplastic polymer, a binder, and a cationic polymer. When the thermoplastic binder and/or the binder were the variables, the cationic polymer in every case was an amide-epichlorohydrin copolymer, namely, either Kymene® 557 or Reten® 204LS, both being supplied by Hercules Inc., Wilmington, Del. The cationic polymer was included at a level of 5 weight percent, based on the weight of the thermoplastic polymer. The second layer was dried by heating at 80°–95° C. The basis weight of the second layer was 30 g/m².

The function of the cationic polymer primarily is to aid retention of the inks after the image has been transferred. Ink retention was tested by soaking the fabric in water after transfer of an image and then drying the fabric. With no cationic polymer in the second layer, most of the dyes comprising the ink are washed out. With 1 weight percent of, for example, Kymene® 557LX, the dyes bled, but there was less bleeding with 2 weight percent of the cationic polymer. Increasing the level to 5 weight percent resulted in only a little bleeding of the red dye; the blue, black, and yellow dyes did not bleed at all. Calgon® 261LV (a quaternary polymer from Calgon Corporation, Pittsburgh, Pa.) was less effective in retaining the inks. Parez® 607 was not effective and Parez® 631NC (both materials being supplied by American Cyanamide, Wayne, N.J.) yellowed badly upon drying the second layer. Corcat® P-145 (a polyethyleneimine from Cordova Chemical Company, North Muskeegon, Mich.) caused the black dye to turn brown when the image was transferred. Finally, Arquad® 218-100 was ineffective in retaining the dyes. Arquad® 218-100 is a quaternary ammonium salt softener from Akzo Chemical Company, McCook, Ill.

In general, a minimum amount of binder is used. For example, 10 weight percent of a polyacrylate, Rhoplex® B-15 (Rohm and Haas Company), gave good printability, but 20 weight percent gave poor results. Excess binder reduces the porosity of the second layer and makes it less absorbent. Another binder which worked well at the 10 weight percent level was Michem® 58035, described above. The binder must be compatible with the cationic polymer. Two binders which are more compatible with the cationic polymer and which yellow less than the Michem® 58035 are Airflex® 124 and Airflex® 125, both poly(vinyl alcohol)-stabilized ethylene-vinyl acetate copolymers. The materials are available from Air Products and Chemicals, Inc., Allentown, Pa.

Several thermoplastic polymers were found to be effective. One was Microthene® FE 532, an ethylene-vinyl acetate copolymer supplied by USI Chemicals Co., Cincinnati, Ohio. The particle size is reported to average approximately 20 micrometers. The Vicat softening point is 75° C. The melt flow rate of the copolymer is 9 g/10 minutes and it is reported to have a density of 0.928 g/cm³. Another effective thermoplastic polymer was Microthene® FN 500, a low density polyethylene powder also supplied by USI Chemicals Co. The material has an average particle size of 20 micrometers, a Vicat softening point of 83° C., a melt flow rate of 22 g/10 minutes, and a density of 0.915 g/cm³.

A number of other thermoplastic polymers were tried, such as MP 22, a micronized polyethylene wax from Micro Powders, Inc., Scarsdale, N.Y. It has a reported melting point of 104° C., an average particle size of 4 micrometers, and a "high" melt flow rate. The polymer gave a smooth coating, but didn't accept the ink well. A micronized polyethylene wax, MPP 611, also from Micro Powders, Inc., gave a coating which accepted ink well but did not retain an image on washing. The polymer has a reported melting point of 110° C., an average particle size of 6 micrometers, and a "high" melt flow rate. However, use of a different cationic polymer overcame these difficulties, as is demonstrated in the next example.

Example 2

One of the concerns with the printable materials of Example 1 was that the surface was quite rough due to the heavy coating of relatively coarse particles of thermoplastic polymer. In addition, the low binder content was not sufficient to prevent damage to the second layer when the printable material went through the printer, the damage being caused by the printer transport rollers. Consequently, a number of thermoplastic polymers having smaller particles were evaluated, in addition to some of those reported in Example 1.

In general, the procedure described in Example 1 was followed. The various thermoplastic polymers investigated were as follows:

Thermoplastic Polymer A

This polymer was Microthene® FE 532, described in Example 1

Thermoplastic Polymer B

This material was Microthene® FN-500, also described in Example 1.

Thermoplastic Polymer C

Thermoplastic Polymer C was Corvel® 2093. It is a polyester. The average particle size was 20 micrometers, the melting point of the polymer was approximately 80° C., and the melt flow rate was reported to be "high." The material was supplied by Powder Coatings Group of the Morton Chemical Division, Morton Thiokol, Inc., Reading, Pa.

Thermoplastic Polymer D

This polymer was MP 22, described in Example 1.

Thermoplastic Polymer E

Thermoplastic Polymer E was MPP 611, also described in Example 1.

Thermoplastic Polymer F

This material was MPP 635, also a polyethylene supplied by Micro Powders, Inc. The average particle size of the polymer was 5 micrometers, the melting point was reported to be 124, and the melt flow rate was "high."

Thermoplastic Polymer G

This polymer was Accumist® B6, supplied by Allied Chemical Company, Morristown, N.J. The polymer was a polyethylene having a melting point of 126° C. The average particle size of the polymer was 6 micrometers and the melt flow rate was "high."

Thermoplastic Polymer H

Thermoplastic Polymer H was Accumist® B12, also supplied by Allied Chemical Company. The polymer was a high density polyethylene having a melting point of 126° C. The average particle size of the polymer was 12 micrometers.

Thermoplastic Polymer I

This polymer was DPP 714, a polystyrene dispersion supplied by Dow Chemical Company, Midland, Mich.

Thermoplastic Polymer J

This material was Piccotex® LC55R, a styrene-methyl styrene copolymer dispersion supplied by Hercules, Inc.

Thermoplastic Polymer K

Thermoplastic Polymer K was DL 256, a polystyrene dispersion also supplied by Dow Chemical Company.

Thermoplastic Polymer L

This polymer was BN 4901X, a polystyrene dispersion available from BASF Corporation, Sarnia, Ontario, Canada.

Thermoplastic Polymer M

This material was Ropaque® OP84, a polystyrene dispersion supplied by Rohm and Haas Company, Philadelphia, Pa.

Four different binders were used:

Binder A

Binder A was Carboset® 514H, a polyacrylate binder dispersed in water, supplied by B. F. Goodrich Company, Cleveland, Ohio.

Binder B

This binder was Rhoplex® B15, described in Example 1.

Binder C

Binder C was Michem® 58035, also described in Example 1.

Binder D

This binder was Marklube® 542, a cationic low density polyethylene emulsion from Ivax Industries, Inc., Rock Hill, S.C.

The composition of the second layer and the print quality evaluation results are summarized in Table 1. In the table, the "TP" column identifies the thermoplastic polymer by letter, the "Type" column under the Heading "Binder" similarly identifies the binder by letter, and basis weights are given in g/m².

TABLE 1

Summary of Second Layer Composition and Print Quality Evaluation with Various Thermoplastic Polymers

| TP | Binder Type | Binder Wt.-% | Basis Weight | Print Quality | Comments |
|---|---|---|---|---|---|
| A | A | 10 | 21 | Fair | Weak coating |
| A | B | 10 | 23 | Good | Weak coating |
| A | C | 10 | 23 | Good | Weak coating |
| A | C | 20 | 23 | Poor | Not absorbent enough |
| B | C | 50 | 31 | Poor | Not absorbent |
| B | C | 10 | 23 | Good | Weak coating |
| C | C | 10 | 32 | Var.[a] | |
| D | C | 10 | 30 | Poor | Partly fused on drying |
| E | C | 10 | 23 | Good | |

TABLE 1-continued

Summary of Second Layer Composition
and Print Quality Evaluation with
Various Thermoplastic Polymers

| TP | Binder Type | Binder Wt.-% | Basis Weight | Print Quality | Comments |
|---|---|---|---|---|---|
| E | C | 12.5 | 28 | Good | |
| E | C | 12.5 | 8 | Good | |
| E | C | 12.5 | 13 | Good | |
| F | C | 10 | 23 | Good | |
| F | C | 12.5 | 13 | Good | |
| F | C | 18 | 11 | Good | |
| F | C | 20 | 13 | Good | |
| F | D | 25 | 13 | Good | |
| G | C | 18 | 13 | Good | |
| H | C | 18 | 13 | Good | |
| I | C | 10 | 17 | Good | |
| J | C | 10 | 17 | Var.[a] | Yellows |
| K | C | 10 | 8 | Good | |
| L | C | 10 | 8 | Good | |
| M | C | 10 | 8 | Good | |
| M | C | 30 | 8 | Good | |
| M | C | 40 | 8 | Good | |

[a]Variable; partial fusing in some cases on drying the layer.

Holding all other variables constant, the smaller particle size micronized waxes gave much smoother coatings. The lower melting point waxes, such as MPP 611, gave very absorbent coatings, provided the drying temperature was kept around 80° C. However, drying too long caused some wax fusing which resulted in a water-repellent, non-absorbent coating. Higher melting point waxes, such as Accumist® B12 and MPP 635 were much better, and coatings containing them could be dried over five minutes at 80° C., or even for about one minute at 107° C., without making the coating non-absorbent. Coatings made with the finer micronized waxes were mechanically stronger. In addition, more binder, up to about 30 weight percent, could be added without causing poor printing.

The polystyrene lattices, which have very small particles sizes but don't form films unless heated to over 110° C. or so, behaved similarly to the micronized wax dispersions. However, neither Ropaque® OP84 nor Dow DL256 was compatible with the Kymene® 557 (or probably any other cationic polymers); BN 4901X was compatible, however. In general, coatings composed mainly of polystyrene did not melt to a low enough viscosity to provide good transfer of an image into fabrics at a transfer temperature of about 177° C. The coatings did fuse, however; when printed coatings were heated and fused, the printing became permanently attached to the paper.

Example 3

It was desired to improve the ease of transfer of an image on the printable material, since the ink jet printers would enable home color printing with computers and consumers would be hand-ironing the transfers onto fabric. Although the printable materials described in Examples 1 and 2 in many cases gave good results when transfers were accomplished with a heated press, hand ironing often was less than satisfactory. Because the typical hand iron does not cover an entire 8.5×11 inch sheet, some areas become too hot, while others do not get hot enough. In the overheated areas, molten coating tends to be absorbed into the paper or first layer, along with part of the image, and the image which does, in fact, transfer to the fabric is dull. In the areas where heating is insufficient, the paper or first layer is difficult to remove from the fabric.

These problems were overcome by creating a printable material having three layers in addition to the first layer or base sheet. In general, the layer adjacent to the first layer or paper base sheet was a low molecular weight polymer film layer, referred to hereinafter as the fourth layer. The next layer was a film based on a polymer having a higher molecular weight, referred to hereinafter as the third layer. Finally, the second layer consisted mainly of low molecular weight polyethylene wax particles. With this type construction, the image was forced into the fabric while, when the paper was removed from the fabric, the separation of the paper from the image occurred near the paper surface in the third layer adjacent to the paper.

A number of three- and four-layered samples (including the first layer or base sheet) were evaluated. In every case, the second layer consisted of 77 weight percent MPP 635 (Thermoplastic Polymer F), 8 weight percent BN 4901X (Thermoplastic Polymer L), 10 weight percent Michem® 58035 (Binder C), 4 weight percent Reten® 204LS (cationic polymer), and 1 weight percent Triton® X-100, a surfactant, all based on the total weight of the layer. These weights of binder, cationic polymer, and surfactant were equivalent to 12, 5, and 1 weight percent, respectively, based on the weight of thermoplastic polymer. The basis weight of the coating was 12 g/m². The various samples evaluated are summarized below. It may be noted that the best results were obtained with an extruded third layer or coextruded third and fourth layers.

Sample A

Fourth layer: The layer consisted of 20 weight percent Michem® 4983 and 80 weight percent Michem® 58035 (both described earlier), applied to the paper as a mixed latex. The basis weight of the layer was 13 g/m².

Third layer: The layer consisted of Michem® 4983 which was applied over the fourth layer as a latex. The basis weight of the layer was 10 g/m².

Ironability: Poor.

Sample B

Fourth layer: The layer consisted of 45 weight percent Michem® 4983 and 55 weight percent Chemawax® 40. The layer was applied as a mixed latex. The basis weight of the layer was 8 g/m².

Third layer: The layer consisted of Elvax® 420, formed by melt extrusion at a basis weight of 20 g/m².

Ironability: Fair.

Sample C

Fourth layer: The layer consisted of Michem® 58035, applied as a dispersion. The basis weight of the layer was 8 g/m².

Third layer: The layer consisted of Michem® 4983, applied as a latex. The basis weight of the layer was 10 g/m².

Ironability: Poor.

Sample D

Fourth layer: Not present.

Third layer: The layer, located adjacent to the paper, consisted of Elvax® 210, which was applied as a solution. The basis weight of the layer was 20 g/m².

Ironability: Fair.

Sample E

Fourth layer: Not present.

Third layer: The layer, located adjacent to the paper, consisted of Epolene® C13 which was formed by melt extrusion at a basis weight of 20 g/m². The polymer was a 200 melt flow rate low density polyethylene obtained from Eastman Chemical Products, Inc., Kingsport, Tenn.

Ironability: Fair.

Sample F

Fourth layer: The layer was the same as for Sample B

Third layer: The layer was the same as for Sample E.

Ironability: Good.

Another material which served well as the third layer and which can be extrusion coated on the first layer, or paper base sheet, was Nucrel® RX 62, supplied by E. I. Du Pont de Nemours and Company, Inc., Wilmington, Del. The polymer is an ethylene-methacrylic acid copolymer having 10 weight percent methacrylic acid and a melt flow rate of around 500 g/10 min.

Example 4

Because the Hewlett Packard Desk Jet 550 is becoming the color office printer of choice, it was desired to make a printable material which could be used with that printer. Because the printer is designed to use ordinary paper, the inks tend to penetrate and spread faster than the Paint Jet inks. While the printable materials described in Examples 1 and 2 worked well with the Paint Jet printer, use with the Desk Jet printer often resulted in poor images. Increasing the basis weight of the second layer resulted in a fuzzier image. Ink spreading occurred when the basis weight of the second layer was decreased. Changes in binder levels caused similar results.

Efforts to overcome the above problems centered primarily on the addition to the second layer of moisture-absorbing materials which would at least partially fill the pores of the layer. The materials investigated included silica and water-swellable or water-soluble polymers. Silica helped somewhat, but adding too much caused poor transfer of the second layer to fabric. Water-soluble polymers investigated included poly(vinyl alcohol), methyl cellulose, and various poly(oxyethylenes). The poly(vinyl alcohol) had little effect and caused poor transfer. The methyl cellulose (Methocel® A-15) gave a much better print and did help reduce ink spreading. At levels needed to be effective, however, it caused poorer transfer of the second layer. Low molecular weight poly(oxyethylenes), such as the Carbowax® materials, also gave improvements, but fairly high levels were required which prevented drying of the inks. Such materials, however, did help prevent dulling of the inks on transfer of the image. Higher molecular weight poly(oxyethylenes), such as the Polyox® polymers, gave excellent results.

For these experiments, the paper was a label stock having a print coating on both sides, as described in Example 1. A third layer was employed between the label stock and the second layer. This third layer consisted of Elvax® 3200, a 30 melt flow rate ethylene-vinyl acetate copolymer containing a wax modifier, from E. I. Du Pont de Nemours and Company, Inc. The basis weight of this third layer was about 25 g/m². The thermoplastic polymers used were Accumist® A12 (Thermoplastic Polymer N), an oxidized polyethylene having a melting point of 136° C. and an average particle size of 12 micrometers from Allied Chemical Company, Microthene® Fe 532 (Thermoplastic Polymer A), and MPP 635 (Thermoplastic Polymer F) (see Example 2). The binder employed in the second layer was either Michem® 58035 (Binder C) or Marklube® 542 (Binder D) (again, see Example 2). The level of binder was 20 weight percent, based on the weight of the thermoplastic polymer.

The materials evaluated are described in more detail below and the results are summarized in Table 3. In the table, the additive is identified by its letter designation in the "Add." column. The amounts of additive are given in weight percent, based on the amount of thermoplastic polymer, in the "Amt." column.

Additive A

This additive was Syloid® 244, a silica supplied by W. R. Grace and Company, Baltimore, Md.

Additive B

Additive B was Carbowax® 300, a poly(ethylene glycol), or poly(oxyethylene), having a weight-average molecular weight of about 300. The material was supplied by Union Carbide Corporation, Danbury, Conn.

Additive C

The additive was triethylene glycol.

Additive D

This additive was Carbowax® 200, a poly(ethylene glycol), or poly(oxyethylene), having a weight-average molecular weight of about 200. The material was supplied by Union Carbide Corporation.

Additive E

Additive E was Methocel® A-15, a low viscosity methyl cellulose from Dow Chemical Company.

Additive F

This additive was Methocel® K4M, a high viscosity methyl cellulose from Dow Chemical Company.

Additive G

The additive was Airvol® 107, a poly(vinyl alcohol) from Air Products and Chemicals, Inc.

Additive H

This additive was PEG 20M, a poly(ethylene glycol), or poly(oxyethylene), having a weight-average molecular weight of about 20,000. The material was supplied by Dow Chemical Company.

Additive I

The additive was Polyox® N10, a poly(ethylene glycol), or poly(oxyethylene), having a weight-average molecular weight of about 100,000. The material was supplied by Union Carbide Corporation.

Additive J

This additive was Polyox® N80, a poly(ethylene glycol), or poly(oxyethylene), having a weight-average molecular weight of about 200,000. The material was supplied by Union Carbide Corporation.

TABLE 3

Evaluation of Water-Absorbent Additives

| Add. | Amt. | TP | Binder | Print Definition | Comments |
|---|---|---|---|---|---|
| — | — | F | C | Poor | Control |
| A | 10 | F | C | Slightly improved | Poor transfer |
| A | 5 | F | C | Slightly improved | Poor transfer |
| A | 1 | F | C | Slightly improved | Transfer acceptable |
| B | 20 | F | D | Slower ink spreading | Improved transferred color |
| C | 10 | F | D | Similar to control | Improved transferred color |
| D | 10 | F | D | Similar to control | Improved transferred color |
| E | 12 | A | D | Fair | Poor transfer |
| E | 6 | A | D | Fair | Fair transfer |
| E | 3 | A | D | Poor | |
| F | 1 | F | D | Poor | Slow ink drying |
| F | 2 | F | D | Fair | Slow ink drying |
| G | 2 | F | D | Poor | |
| G | 4 | F | D | Fair | Slow ink drying |
| G | 6 | F | D | Fair | Slow ink drying |
| H | 10 | F | D | Good | Slow ink drying |
| I | 10 | F | C | Good | Slow ink drying |
| J | 2 | N | C | Good | |
| J | 4 | N | C | Very good | |
| J | 20 | N | C | Excellent | Basis weight was 5 g/m$^2$ |

Example 5

Although the inclusion of a cationic polymer in the second layer resolved some problems, as already described, the cationic polymer sometimes was subject to yellowing, particularly if transfer temperatures were not carefully controlled. Consequently, various cationic polymers were evaluated, with the results being summarized in Table 4. In the table, the amount of cationic polymer employed is given as weight percent, based on the amount of thermoplastic polymer. In addition, two types of second layers were employed, in which the cationic polymer was included as a component. Type A consisted of Microthene® FE 532 (Thermoplastic Polymer A), 13 weight percent of Michem® 58035 binder (Binder C), based on the weight of the thermoplastic polymer, 1 weight percent Triton® X-100 surfactant, and the cationic polymer. The basis weight of the layer was 30 g/m$^2$. The Type B layer consisted of MPP 635 (Thermoplastic Polymer F), 18 weight percent of Michem® 58035 binder (Binder C), based on the weight of the thermoplastic polymer, 1 weight percent Triton® X-100 surfactant, and the cationic polymer. The basis weight of the layer was 13 g/m$^2$. When The Type B second layer was employed, a third layer consisting of Michem® 58035 at a basis weight of 17 g/m$^2$ was employed, adjacent to the paper or first layer. The various cationic polymers evaluated were as follows:

Cationic Polymer A

Cationic Polymer A was Kymene® 557, an amide-epichlorohydrin copolymer available from Hercules, Inc.

Cationic Polymer B

This polymer was Calgan® 261LV, a quaternary polymer. It is available from Calgon Corporation.

Cationic Polymer C

This material was Corcat® P145. It was a polyethyleneimine supplied by Cordova Chemical Company.

Cationic Polymer D

Cationic Polymer D was Parez® 631NC, a polyacrylamide available from American Cyanamide.

Cationic Polymer E

This material was Betz® 1260. It was obtained from Betz Paperchem, Trevose, Pa.

Cationic Polymer F

This polymer was Reten® 204LS, an amide-epichlorohydrin copolymer available from Hercules, Inc.

Cationic Polymer G

Verona® C-300 from Miles Inc., Pittsburgh, Pa.

Cationic Polymer H

Aquaprox® UP103 from Synthron, Morgantown, N.C.

Cationic Polymer I

Tinofix® EW from Ciba-Geigy Corporation, Hawthorn, N.Y.

Cationic Polymer J

Reactofix® ES from Ivax Industries, Inc.

Cationic Polymer K

Protefix® TS, a cationic carbamide from Synthron.

In the table, the column "CP Type" identifies the cationic polymer, whereas the column "Type" identifies the type of second layer employed, as described above.

TABLE 4

Evaluation of Various Cationic Polymers

| CP Type | Amount | Type | Effectiveness | Comments |
|---|---|---|---|---|
| A | 2 | A | Fair | |
| A | 4 | A | Good | |
| A | 6 | A | Very good | Yellows from heating |
| B | 2 | A | Poor | |
| B | 4 | A | Fair | |

TABLE 4-continued

Evaluation of Various Cationic Polymers

| CP Type | Amount | Type | Effectiveness | Comments |
|---|---|---|---|---|
| C | 2 | A | | Ink discolors |
| C | 4 | A | | Poor transfer |
| D | 2 | A | | Yellows badly |
| D | 4 | A | | |
| E | 2 | A | | Coating dispersion too viscous |
| F | 5 | A | Good | Better than CPA - less yellowing |
| F | 4 | A | Fair | |
| F | 8 | A | Excellent | |
| G | 8 | B | Fair | |
| H | 8 | B | Poor | |
| I | 8 | B | Poor | |
| J | 8 | B | Poor | |
| K | 8 | B | Poor | |

In summary, the best ink jet printable heat transfer paper prepared had three layers in addition to the first layer, or paper base sheet. The fourth layer, the layer adjacent to the first layer, desirably is prepared from a polyethylene wax/ ethylene-acrylic acid copolymer latex blend. The basis weight of the layer desirably is about 13 g/m². Alternatively, the layer can be prepared by extrusion coating the first layer with an ethylene-vinyl acetate copolymer. The third layer desirably is formed by melt extrusion over the fourth layer at a basis weight of about 20 g/m². The layer desirably will consist of a high melt flow rate ethylene-vinyl acetate copolymer or a high melt flow rate polyethylene. Finally, the second layer desirably consists primarily of polyethylene wax particles having largest dimensions of from about 4 to about 15 micrometers and a melting point of 104°–140° C. The layer also contains a heat-softenable binder at about 10 to about 30 weight percent, based on the weight of thermoplastic polymer, and, desirably, 5–10 weight percent of a cationic polymer. Desirably, the second layer also contains a low molecular weight poly(oxyethylene) humectant and a high molecular weight poly(oxyethylene) for print definition, both at levels of 2–10 weight percent, based on the weight of thermoplastic polymer.

Example 6

In a final series of experiments, the formulations involving Cationic Polymer F as reported in Example 5 were modified further since yellowing still was encountered when images were heat transferred.

In the experiments, the label stock base (or first layer) was extrusion coated with 44 g/m² of Nucrel® RX62 (the third layer), an ethylene-methacrylic acid copolymer having a melt flow rate of 600 g/10 minutes supplied by E. I. Du Pont de Nemours and Co., Inc. The second layer had a basis weight of approximately 13 g/m².

The binder employed in the second layer was either Airflex® 124 (Binder E) or Airflex 125® (Binder F). The binder was present at a level of 26 weight percent, based on the weight of the thermoplastic polymer. The cationic polymer used was Reten® 204LS, the humectant was Polyglycol® E200, a poly(ethylene glycol) from Dow Chemical Company having a weight-average molecular weight of about 200; the humectant level was 10 weight percent, based on the weight of the thermoplastic polymer. The surfactant was Triton® X-100 at a level of 3 weight percent, based on the weight of thermoplastic polymer employed. The ink viscosity modifier was Polyox® N80 at a level of 3 weight percent, also based on the weight of the thermoplastic polymer. The thermoplastic polymers evaluated included micropowders MPP 635 and Accumist® A-12, from Micropowders and Allied Chemical Company, respectively. Images were printed on the second layer as described in Example 4 and transferred to cotton fabric as described in Example 1. The results of the experiments are summarized in Table 5. In the table, the "TP" column identifies the thermoplastic polymer by letter (see Example 2), the "Wt.-% CP" column identifies the amount of Reten® 204LS employed in the second layer in weight percent, based on the weight of the thermoplastic polymer, and the "Wt.-% Acid" column identifies the amount of citric acid included in the second layer, in weight-percent based on the weight of the thermoplastic polymer.

TABLE 5

Summary of Cationic Polymer F Formulation Modifications

| Sample | Binder | TP | Parts CP | Wt.-% Acid | Yellowing |
|---|---|---|---|---|---|
| 1 | F | H | 8 | None | Yes, slight |
| 2 | F | H | 8 | 4 | Very slight |
| 3 | E | H | 8 | None | Yes, slight |
| 4 | F | F | 8 | None | Negligible |
| 5 | F | F | 12 | None | Negligible |
| 6 | F | F | 16 | None | Negligible |

Because yellowing also was seen on occasion in samples of printable material before transfer of the image, an accelerated yellowing test was developed. The test consisted of heating samples of a printable material in an oven at 55° C. for three days. When subjected to this procedure, Samples 6 and 2 did not yellow noticeably, whereas Sample 1 became much more yellow.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A printable material having first and second surfaces, the printable material comprising:

a first layer defining the first surface; and a second layer defining the second surface, which layer comprises particles of a thermoplastic polymer having largest dimensions of less than about 50 micrometers;

from about 10 to about 50 weight percent of a film-forming binder, based on the weight of the thermoplastic polymer; and from about 0.2 to about 10 weight percent of an ink viscosity modifier, based on the weight of the thermoplastic polymer.

2. The printable material of claim 1, in which said second layer has a melting point of from about 65 to about 180 degrees Celsius.

3. The printable material of claim 2, in which the second layer also contains from about 2 to about 20 weight percent of a cationic polymer, based on the weight of the thermoplastic polymer.

4. The printable material of claim 1, in which the second layer also contains from about 1 to about 20 weight percent of a humectant, based on the weight of the thermoplastic polymer.

5. The printable material of claim 4, in which the humectant is selected from the group consisting of ethylene glycol and polyethylene glycol.

6. The printable material of claim 5, in which the humectant is a polyethylene glycol having a weight-average molecular weight of from about 100 to about 40,000.

7. The printable material of claim 6, in which the humectant is a polyethylene glycol having a weight-average molecular weight of from about 200 to about 800.

8. The printable material of claim 1, in which the ink viscosity modifier is a polyethylene glycol having a weight-average molecular weight of from about 100,000 to about 2,000,000.

9. The printable material of claim 8, in which the ink viscosity modifier is a polyethylene glycol having a weight-average molecular weight of from about 100,000 to about 600,000.

10. The printable material of claim 1, in which the second layer also includes from about 0.1 to about 5 weight percent of a weak acid, based on the weight of the thermoplastic polymer.

11. The printable material of claim 1, in which the second layer further includes from about 0.5 to about 5 weight percent of a surfactant, based on the weight of the thermoplastic polymer.

12. The printable material of claim 11, in which the surfactant is a nonionic or cationic surfactant.

13. The printable material of claim 1, in which a release layer is interposed between the first layer and the second layer.

14. The printable material of claim 1, in which a melt-transfer film layer is interposed between the first layer and the second layer.

15. The printable material of claim 1, in which the first layer is a film.

16. The printable material of claim 1, in which the first layer is a cellulosic nonwoven web.

17. The printable material of claim 16, in which the first layer is a paper.

18. An ink jet printable heat transfer material which comprises:

a first layer having first and second surfaces and selected from the group consisting of films and cellulosic nonwoven webs; and a second layer which is receptive to ink jet ink overlaying the first surface of the first layer, which second layer melts from about 65 to about 180 degrees Celsius and comprises:

particles of a thermoplastic polymer having largest dimensions of less than about 50 micrometers;

from about 10 to about 50 weight percent of a film-forming binder, based on the thermoplastic polymer; and from about 2 to about 20 weight percent of a cationic polymer, based on the weight of the thermoplastic polymer.

19. The ink jet printable heat transfer material of claim 18, in which the second layer further comprises:

from about 1 to about 20 weight percent of a humectant, based on the weight of the thermoplastic polymer;

from about 0.2 to about 10 weight percent of an ink jet ink viscosity modifier, based on the weight of the thermoplastic polymer; and from about 0.5 to about 5 weight percent of a surfactant, based on the weight of the thermoplastic polymer.

20. The ink jet printable heat transfer material of claim 19, in which the humectant is selected from the group consisting of ethylene glycol and polyethylene glycol.

21. The ink jet printable heat transfer material of claim 20, in which the humectant is a polyethylene glycol having a weight-average molecular weight of from about 100 to about 40,000.

22. The ink jet printable heat transfer material of claim 21, in which the humectant is a polyethylene glycol having a weight-average molecular weight of from about 200 to about 800.

23. The ink jet printable heat transfer material of claim 19, in which the ink jet ink viscosity modifier is a polyethylene glycol having a weight-average molecular weight of from about 100,000 to about 2,000,000.

24. The ink jet printable heat transfer material of claim 23, in which the ink jet ink viscosity modifier is a polyethylene glycol having a weight-average molecular weight of from about 100,000 to about 600,000.

25. The ink jet printable heat transfer material of claim 19, in which the surfactant is a nonionic or cationic surfactant.

26. The ink jet printable heat transfer material of claim 19, in which the second layer also contains from about 0.1 to about 5 weight percent of a weak acid, based on the weight of the thermoplastic polymer.

27. An ink jet printable heat transfer material which comprises:

a first layer having first and second surfaces and selected from the group consisting of films and cellulosic nonwoven webs;

a third layer overlaying the first surface of the first layer; and a second layer which is receptive to ink jet ink overlaying the second layer, which second layer melts from about 65 to about 180 degrees Celsius and comprises:

particles of a thermoplastic polymer having largest dimensions of less than about 50 micrometers;

from about 10 to about 50 weight percent of a film-forming binder, based on the thermoplastic polymer; and from about 2 to about 20 weight percent of a cationic polymer, based on the weight of the thermoplastic polymer.

28. The ink jet printable heat transfer material of claim 27, in which the second layer further comprises:

from about 1 to about 20 weight percent of a humectant, based on the weight of the thermoplastic polymer;

from about 0.2 to about 10 weight percent of an ink jet ink viscosity modifier, based on the weight of the thermoplastic polymer; and from about 0.5 to about 5 weight percent of a surfactant, based on the weight of the thermoplastic polymer.

29. The ink jet printable heat transfer material of claim 28, in which the third layer is a release layer.

30. The ink jet printable heat transfer material of claim 28, in which the third layer is a melt-transfer film layer.

31. The ink jet printable heat transfer material of claim 28, in which the humectant is selected from the group consisting of ethylene glycol and polyethylene glycol.

32. The ink jet printable heat transfer material of claim 31, in which the humectant is a polyethylene glycol having a weight-average molecular weight of from about 100 to about 40,000.

33. The ink jet printable heat transfer material of claim 32, in which the humectant is a polyethylene glycol having a weight-average molecular weight of from about 200 to about 800.

34. The ink jet printable heat transfer material of claim 28, in which the ink jet ink viscosity modifier is a polyethylene glycol having a weight-average molecular weight of from about 100,000 to about 2,000,000.

35. The ink jet printable heat transfer material of claim 34, in which the ink jet ink viscosity modifier is a polyethylene glycol having a weight-average molecular weight of from about 100,000 to about 600,000.

36. The ink jet printable heat transfer material of claim 28, in which the surfactant is a nonionic or cationic surfactant.

37. The ink jet printable heat transfer material of claim 28, in which the second layer also contains from about 0.1 to about 5 weight percent of a weak acid, based on the weight of the thermoplastic polymer.

38. The printable material of claim 1, in which the ink viscosity modifier is a low viscosity methyl cellulose.

39. The printable material of claim 1, in which the ink viscosity modifier is a high viscosity methyl cellulose.

40. The printable material of claim 1, in which the ink viscosity modifier is a poly(vinyl alcohol).

41. The ink jet printable heat transfer material of claim 19, in which the ink viscosity modifier is a low viscosity methyl cellulose.

42. The ink jet printable heat transfer material of claim 19, in which the ink viscosity modifier is a high viscosity methyl cellulose.

43. The ink jet printable heat transfer material of claim 19, in which the ink viscosity modifier is a poly(vinyl alcohol).

44. The ink jet printable heat transfer material of claim 28, in which the ink viscosity modifier is a low viscosity methyl cellulose.

45. The ink jet printable heat transfer material of claim 28, in which the ink viscosity modifier is a high viscosity methyl cellulose.

46. The ink jet printable heat transfer material of claim 28, in which the ink viscosity modifier is a poly(vinyl alcohol).

* * * * *

UNITED STATES PATENT AND TRADEMARK OFFICE
CERTIFICATE OF CORRECTION

PATENT NO. : 5,501,902

DATED : March 26, 1996

INVENTOR(S) : Francis J. Kronzer

It is certified that error appears in the above-indentified patent and that said Letters Patent is hereby corrected as shown below:

On the title page, item [57],
Abstract, line 1, "portable" should read --printable--.

Signed and Sealed this

Twenty-ninth Day of October 1996

*Attest:*

BRUCE LEHMAN

*Attesting Officer*    Commissioner of Patents and Trademarks